(12) United States Patent
Tadepalli et al.

(10) Patent No.: US 7,349,178 B2
(45) Date of Patent: Mar. 25, 2008

(54) METHOD OF REMOVING PARTICLES FROM AN AIRFLOW AND A DATA STORAGE SYSTEM INCLUDING THE SAME

(75) Inventors: Srinivas Tadepalli, Eden Prairie, MN (US); David Olivero, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 568 days.

(21) Appl. No.: 10/455,463

(22) Filed: Jun. 4, 2003

(65) Prior Publication Data

US 2004/0212920 A1    Oct. 28, 2004

Related U.S. Application Data

(60) Provisional application No. 60/416,617, filed on Oct. 7, 2002.

(51) Int. Cl.
*G11B 33/14* (2006.01)

(52) U.S. Cl. ............................................ 360/97.02

(58) Field of Classification Search ............ 360/97.02, 360/97.03, 97.04
See application file for complete search history.

(56) References Cited

U.S. PATENT DOCUMENTS

| | | | |
|---|---|---|---|
| 5,257,151 A | 10/1993 | Cooper | |
| 5,406,431 A * | 4/1995 | Beecroft | 360/97.02 |
| 5,485,327 A | 1/1996 | Yanagisawa | |
| 6,088,190 A | 7/2000 | Anderson | |
| 6,181,527 B1 | 1/2001 | Contraras | |
| 6,188,545 B1 | 2/2001 | Nguyen | |
| 6,208,484 B1 * | 3/2001 | Voights | 360/97.02 |
| 6,219,201 B1 | 4/2001 | Vaaler | |
| 6,618,222 B1 * | 9/2003 | Watkins et al. | 360/97.02 |

FOREIGN PATENT DOCUMENTS

| | | |
|---|---|---|
| EP | 884457 A2 * | 12/1998 |
| JP | 60013371 A * | 1/1985 |
| JP | 62248192 A * | 10/1987 |
| JP | 02226578 A * | 9/1990 |
| JP | 04103091 A * | 4/1992 |

OTHER PUBLICATIONS

Toney et al, Roughness of molecularly thin perfluoropolyether polymer films, Nov. 13, 2000, Applied Physics Letters, vol. 77, No. 20, pp. 3296-3298.*

George Schuetz, Quality Gaging Tips: Surface Texture From Ra to Rz, 1997, MMS Online.*

* cited by examiner

*Primary Examiner*—David Davis
(74) *Attorney, Agent, or Firm*—Fellers, Snider, et al.

(57) ABSTRACT

A data storage system is provided. The data storage system has an enclosure with at least one disc rotating about a central axis and having a corresponding airflow. The airflow is subject to contamination by particles. A particle deposition surface is located inside the enclosure of the data storage system having a surface roughness of at least 30-microns. The particles contaminating the airflow are deposited on the particle deposition surface.

19 Claims, 7 Drawing Sheets

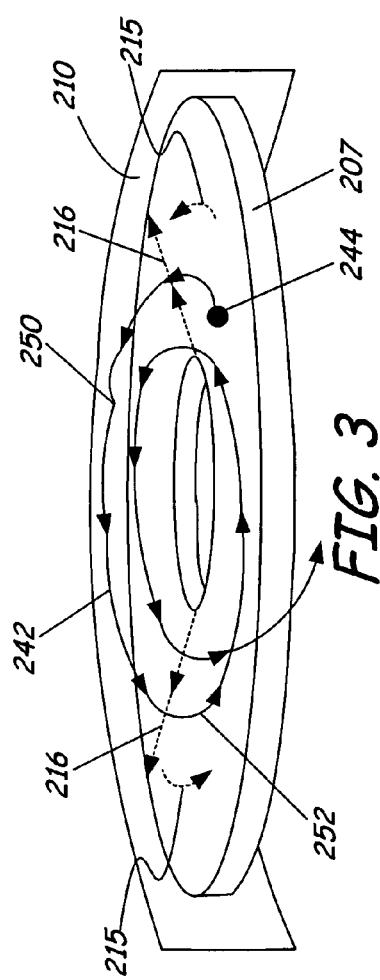
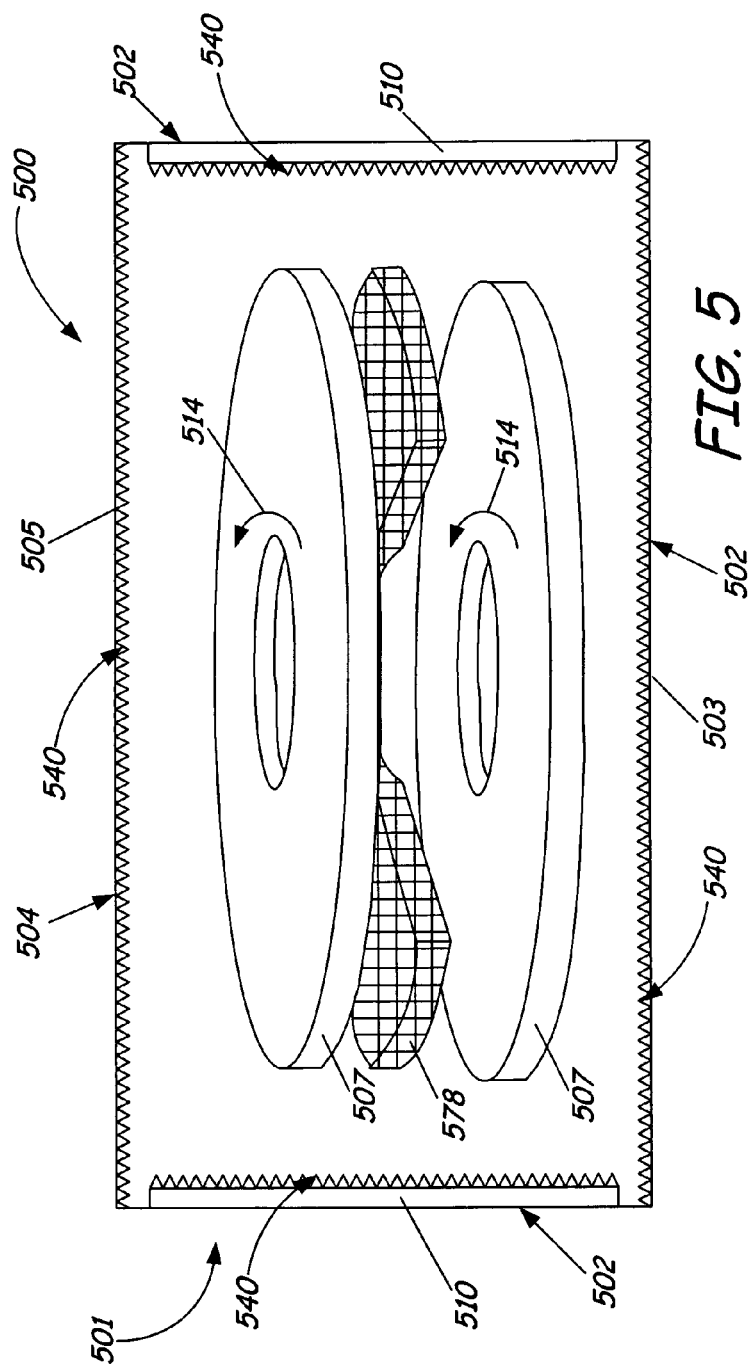

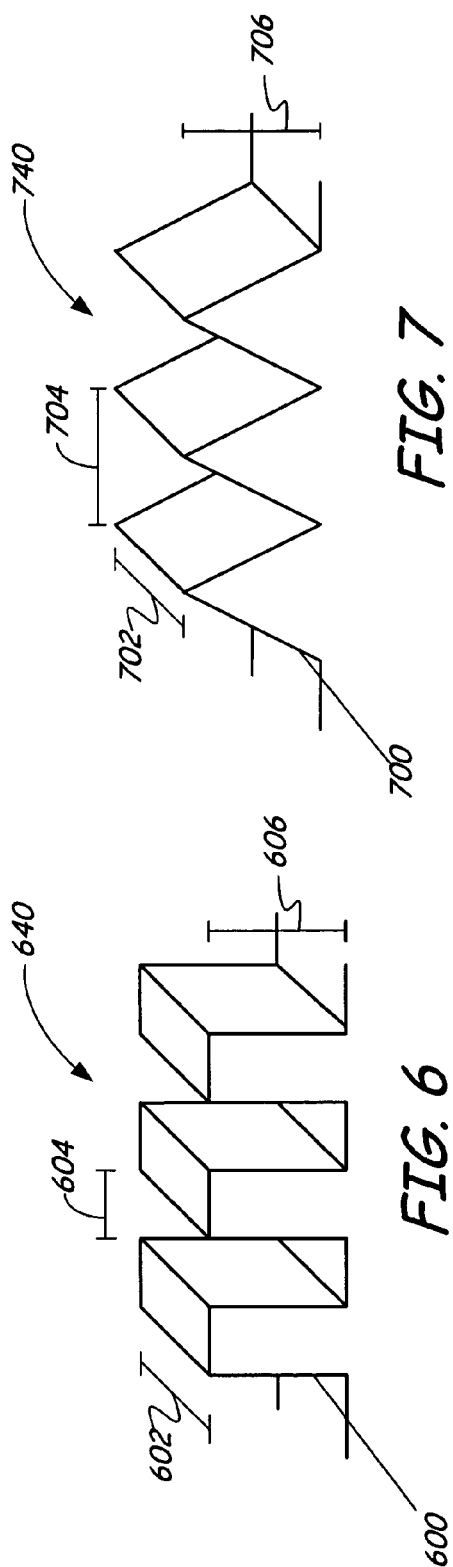
FIG. 6
FIG. 7
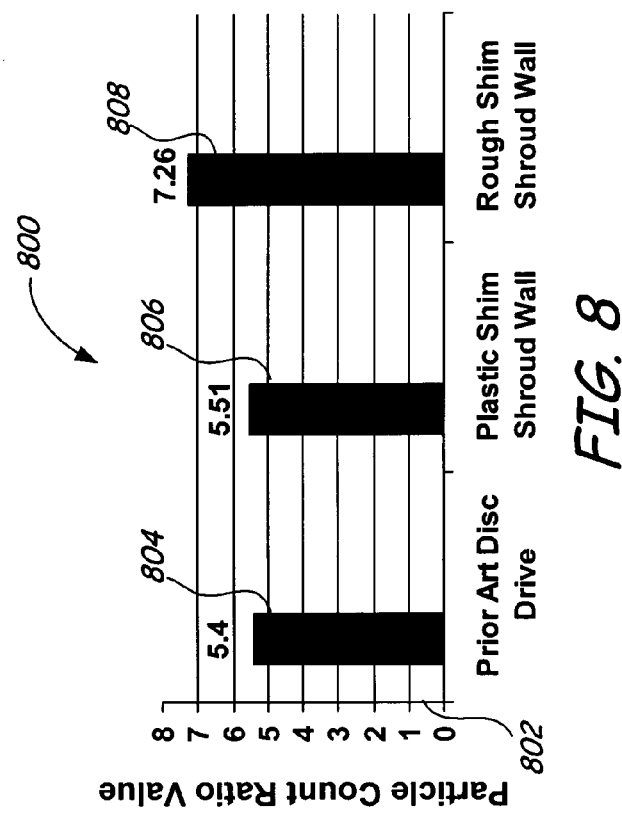
FIG. 8

METHOD OF REMOVING PARTICLES FROM AN AIRFLOW AND A DATA STORAGE SYSTEM INCLUDING THE SAME

CROSS-REFERENCE TO RELATED APPLICATION

This application claims priority from U.S. Provisional Application 60/416,617 filed on Oct. 7, 2002 for inventors Srinivas Tadepalli and David Olivero and entitled Surface Treatment for Particle Robust HDA.

FIELD OF THE INVENTION

The present invention relates generally to methods and components for reducing airborne particles inside data storage systems. In particular, the present invention relates to increasing the deposition of airborne particles on preferred surfaces in a data storage system in order to minimize interaction of the particles with a storage medium surface.

BACKGROUND OF THE INVENTION

Disc drives are common data storage devices. A typical disc drive includes a rigid housing that encloses a variety of disc drive components. The components include one or more discs having data surfaces that are coated with a medium for storage of digital information in a plurality of circular, concentric data tracks. The discs are mounted on a spindle motor that causes the discs to spin and the data surfaces of the discs to pass under aerodynamic bearing disc head sliders. The sliders carry transducers, which write information to and read information from the data surfaces of the discs.

To increase recording density, it has become desirable to reduce the fly height over the disc. During disc drive operation, serious damage to the disc and a loss of data can result during lowered fly height if particles were to become present in the head disc interface (HDI). The primary source of particles in the disc drive is a result of head to disc contacts. A secondary source of particles in the disc drive is the origination of particles in sub-assemblies during manufacture. Other sporadic sources of particles are ramp load and unload events of the actuator mechanism, inner diameter and outer diameter slams, outgassing of certain components at high temperatures, and the limited exchange of particles through the breather hole. The particles in the disc drive's enclosure that become present in the HDI can cause performance problems such as media defects, thermal asperities, stiction, or catastrophic drive failure. Further, particles in the HDI can reach the trailing edge (TE) of the slider and damage the sensitive transducer which can prevent further read/write operations.

Current data storage systems rely on capturing the particles in the disc drive through the recirculation filter. For example, recirculation filter efficiency is governed by its location, orientation, inlet/outlet geometry, filter distance from the disc edge apart from its size, disc spindle speed and disc size. Due to the complexity in the design process and various trade-offs, it is not possible to clean the disc drive by the recirculation filter to the extent required due to the increasing sensitivities of the HDI to smaller sized particles. The increase in sensitivity of the HDI is caused by decreasing head disc spacing budgets (HDSB) and increasing mean time between failures (MTBF) requirements. It is relatively difficult to capture sub-micron particles since they tend to follow the airflow and are affected significantly by the turbulence levels in the disc drive. There is a need to improve the ability to capture sub-micron particles in data storage systems.

Embodiments of the present invention provide solutions to these and/or other problems and offer other advantages over the prior art.

SUMMARY OF THE INVENTION

A data storage system includes an enclosure and at least one disc rotating about a central axis having a corresponding airflow subject to contamination by particles. A particle deposition surface within the enclosure of the data storage system has a surface roughness of at least 30 microns. Particles contaminating the airflow are deposited on the particle deposition surface, thus preventing the particles from interfering with the HDI.

Other features and benefits that characterize embodiments of the present invention will be apparent upon reading the following detailed description and review of the associated drawings.

BRIEF DESCRIPTION OF THE DRAWINGS

FIG. 3 schematically illustrates a cross-sectional view of a path of a particle near a spinning disc in a data storage system.

FIG. 4-1 is a plan view of a base deck showing particle deposition locations.

FIG. 4-2 is a plan view of a base deck showing particle deposition surfaces in accordance with an embodiment of the present invention.

FIG. 4-3 is a perspective view of a base deck showing flow control components.

FIG. 5 is a schematic illustration of a cross-sectional view of an embodiment of the present invention.

FIG. 6 is an expanded view of the surface roughness in an embodiment of the present invention.

FIG. 7 is an expanded view of the surface roughness in an embodiment of the present invention.

FIG. 8 is a plot comparing particle count ratios in a variety of data storage systems.

DETAILED DESCRIPTION

Figure 1:
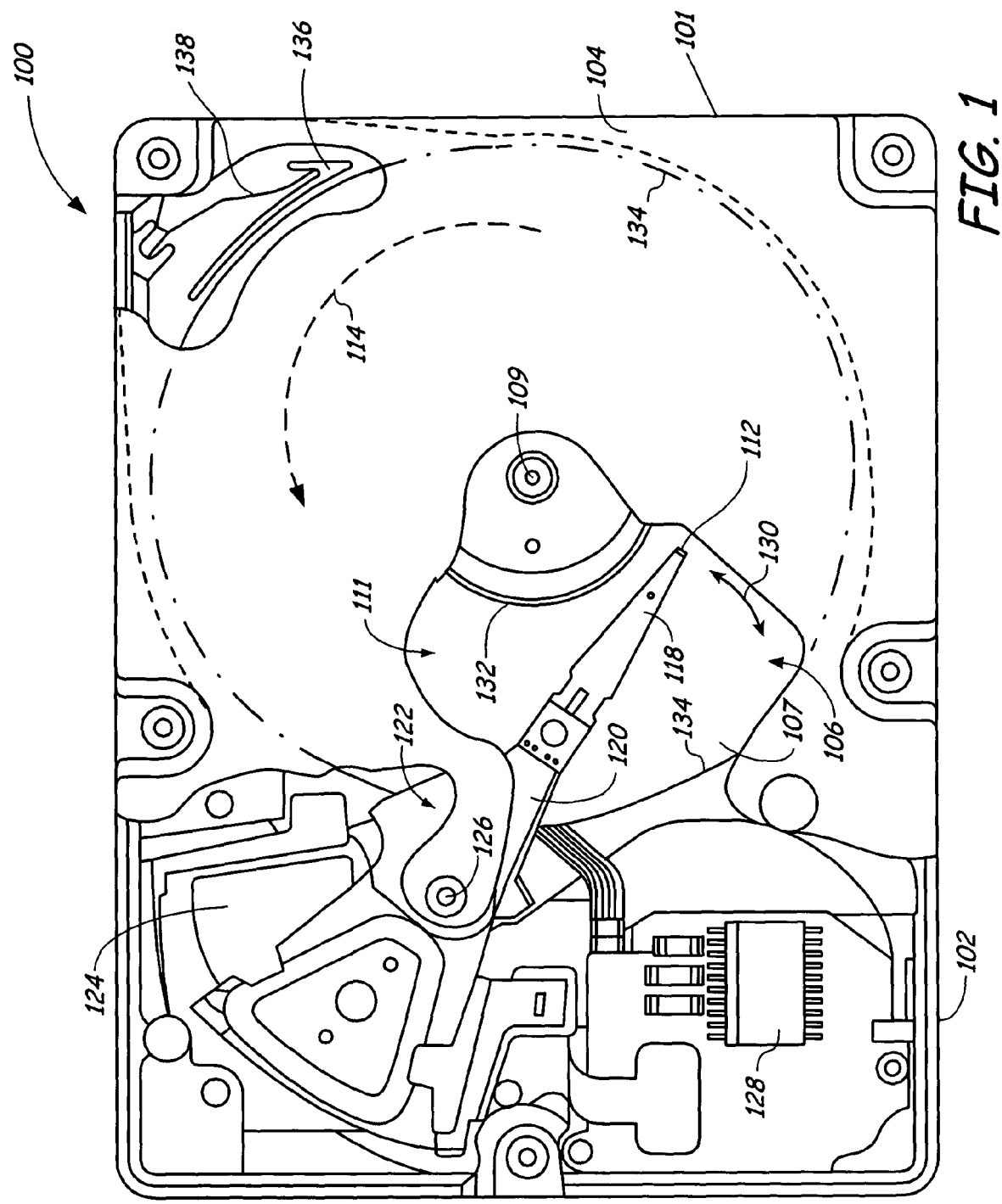
FIG. 1 is a plan view of a disc drive.

FIG. 1 is a plan view of a disc drive 100 in which embodiments of the present invention are useful. Disc drive 100 includes an enclosure 101 with a base deck 102 and a top cover 104 (sections of top cover 104 are removed for clarity). Disc drive 100 further includes a disc pack 106 which is mounted on a spindle motor (not shown). Disc pack 106 includes a plurality of individual discs 107 which are mounted for co-rotation about central axis 109. Each disc 107 has an associated slider 112 which carries a read/write head for communication with disc surface 111. The read/write head can include any type of transducing head, such as an inductive head, a magneto-resistive head, an optical head or a magneto-optical head, or can use other storage techniques.

Each slider 112 is supported by a suspension 118 which is in turn attached to a track accessing arm 120 of an actuator assembly 122. Actuator assembly 122 is rotated about a shaft 126 by a voice coil motor 124, which is controlled by servo control circuitry within internal circuit 128. As voice coil motor 124 rotates actuator assembly 122, slider 112 moves in an arcuate path 130 between a disc inner diameter 132 and a disc outer edge 134.

During operation, as discs 107 rotate in a rotational direction 114, the discs 107 drag air under the respective sliders 112 and along their air bearing surfaces in a direction approximately parallel to the tangential velocity of the discs 107. As the air passes beneath the air bearing surfaces, air compression along the airflow path causes the air pressure between the discs 107 and the air bearing surfaces to increase, which creates a aerodynamic lifting force that counteracts the load force provided by actuator assembly 122 and causes the sliders 112 to lift and fly above or in close proximity to the disc surfaces. While FIG. 1 illustrates one manner of actuating a data head proximate a data storage medium, the present invention, however, is applicable to data storage systems which use other techniques.

During disc drive operation, serious damage to the disc and a loss of data can result during lowered fly height if particles were to become present in the head disc interface (HDI). The primary source of particles in the disc drive is a result of head to disc contacts. The secondary source of particles in the disc drive is the origination of particles in sub-assemblies during manufacture. Other sporadic sources of particles are ramping load and unload events of the actuator mechanism, inner diameter and outer diameter slams, outgassing of certain components at high temperatures, and the limited exchange of particles through the breather hole. Particles pose serious dangers to discs 107, especially in high-density systems in which discs 107 are manufactured as smooth as possible to achieve a lowered fly height.

Discs 107 induce a significant airflow in enclosure 101 as discs 107 rotate in rotational direction 114. Particles can contaminate the airflow. To control contaminants, disc drive 100 contains sub-filtration systems such as recirculation filter 138 and other filtering techniques. Filter support 136 supports recirculation filter 138 as the recirculation filter 138 traps contaminants in the air before the air is recirculated back to disc pack 106.

In spite of the use of recirculation filter 138, there is still a need to reduce the presence of airborne particles in disc drive 100. While recirculation filter 138 has a high particle collection efficiency, disc drive 100 has no mechanism to force one hundred percent of the airflow containing contaminants to flow through recirculation filter 138. A reduction of particles can reduce incidences of lost data or mechanical damage as the density of data storage increases and the dimensions of components and tolerance for the presence of particles decreases.

Figure 2:
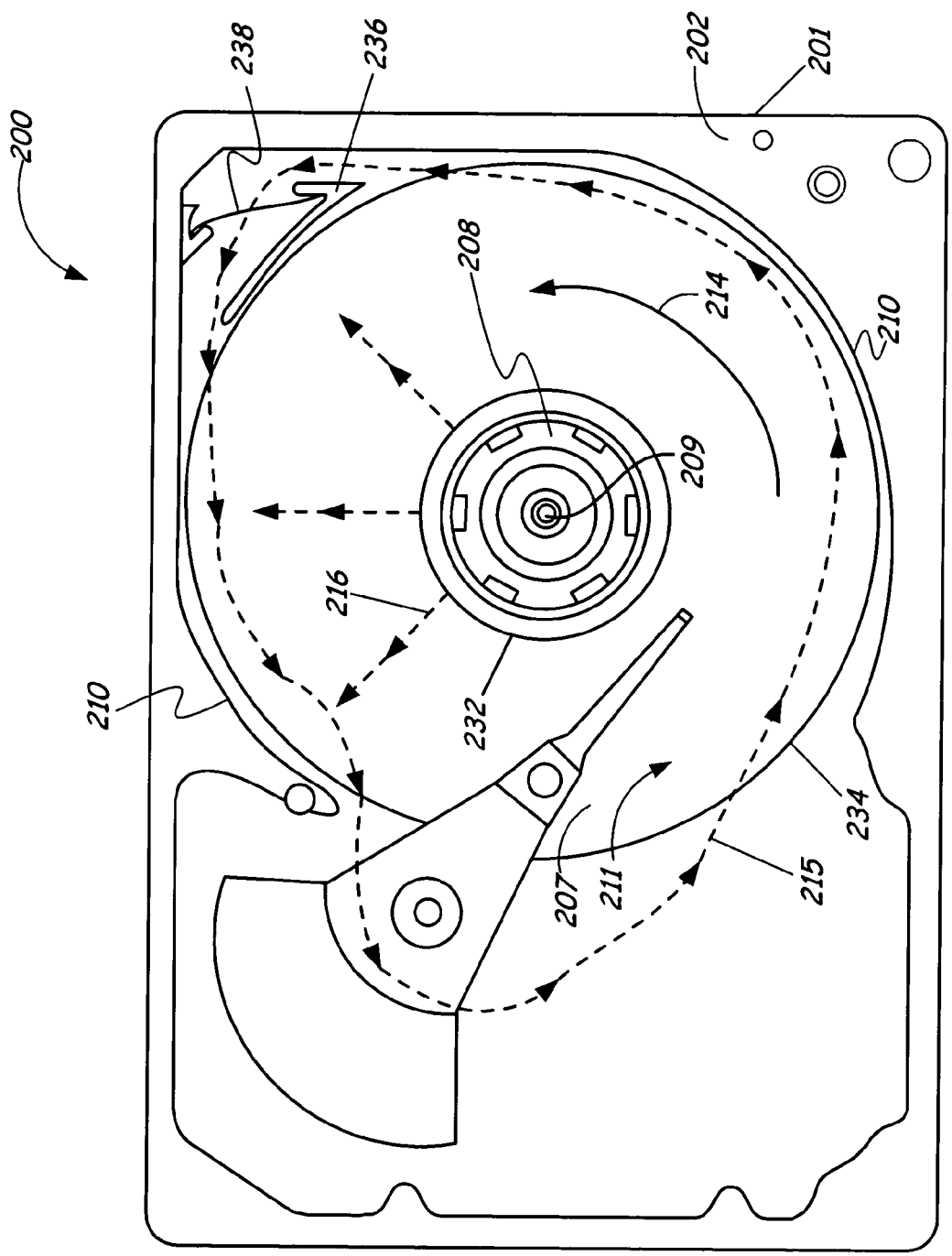
FIG. 2 is a plan view of a prior art base deck for a disc drive.

FIG. 2 is a plan view of base deck 202 in enclosure 201 of prior art disc drive 200. Base deck 202 is configured for incorporation into a data storage system. For example, base deck 202 can be substituted for base deck 102 within disc drive 100 (see FIG. 1). Base deck 202 includes a plurality of individual discs 207 configured to rotate about central axis 209 and are secured to the base deck 202 by disc clamp 208. Base deck 202 also includes filter support 236 configured to support recirculation filter 238.

Discs 207 have disc surfaces 211 that extend from a disc inner diameter 232 to an outer disc edge 234. A layer of air adjacent to disc surface 211 is subject to contamination by particles. Particles range in size from small sub-micron sized particles that are less than one μm to larger sized particles that are greater than one μm. Large particles that are greater than one μm tend to deflect and easily deposit on surfaces in disc drive 200 because of their size and inertia. These larger sized particles are less likely to cause disc drive failure. Sub-micron particles, however, tend to remain airborne in disc drive 200 because of their small size and inertia. Sub-micron particles can easily enter the HDI and are more likely to cause disc drive failure.

During operation, discs 207 spin about a central axis 209 in a rotational direction 214. The spinning of discs 207 induces the layer of air within disc drive 200 to have a velocity. The airflow consists of a component of radial airflow 216 and a component of circumferential airflow 215. A centrifugal force in spinning air adjacent the spinning discs 207 creates radial airflow 216. Both radial airflow 216 and circumferential airflow 215 can carry undesired particles.

Base deck 202 also includes a shroud wall 210 spaced apart from the outer disc edge 234 and facing radial airflow 216. Shroud wall 210 substantially surrounds discs 207 about the circumferences of discs 207. Those skilled in the art should recognize that other shroud walls exist within disc drive 200 that do not completely surround the discs.

Figures 1, 4:
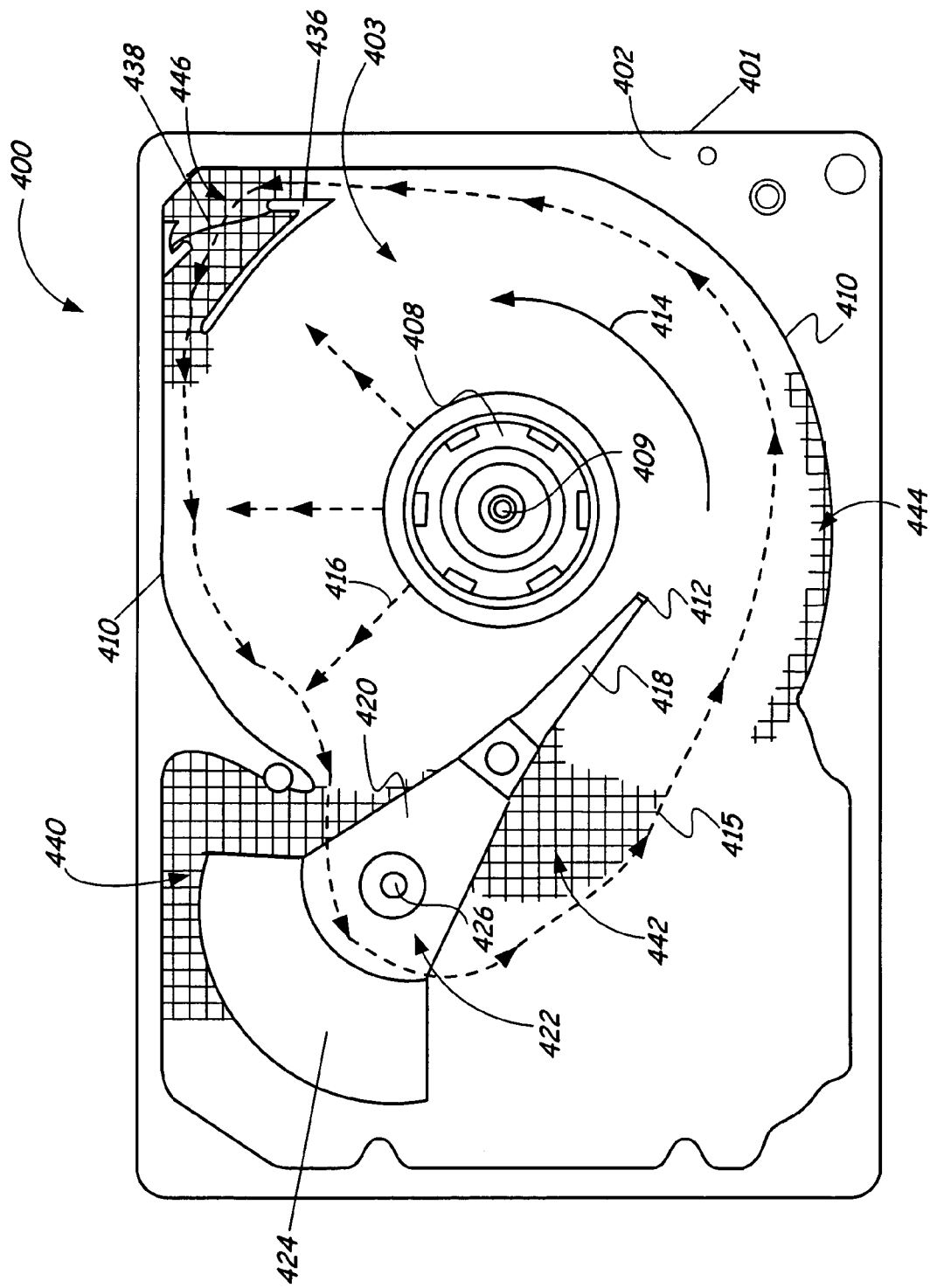
Figures 2, 4:
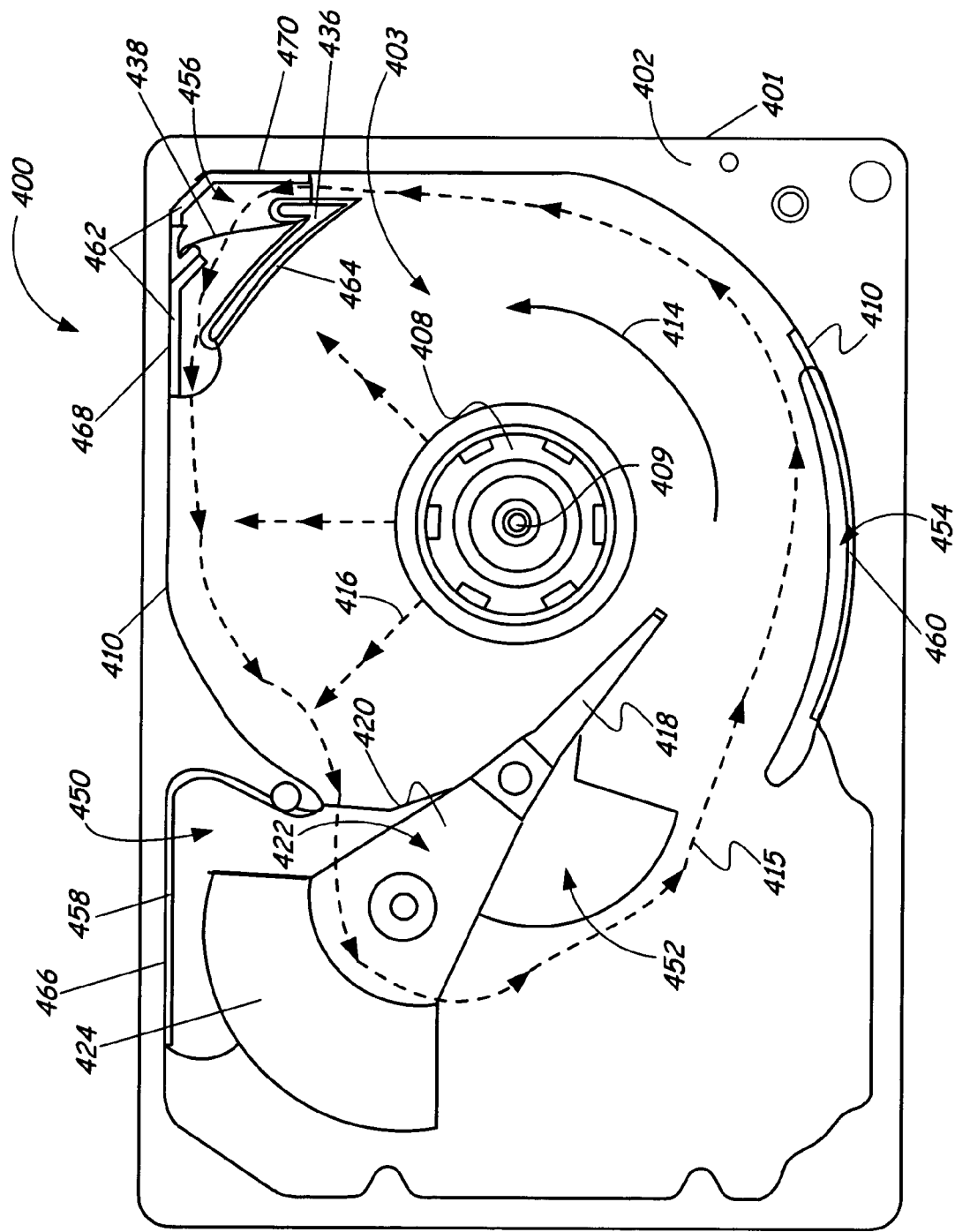
Figures 3, 4:
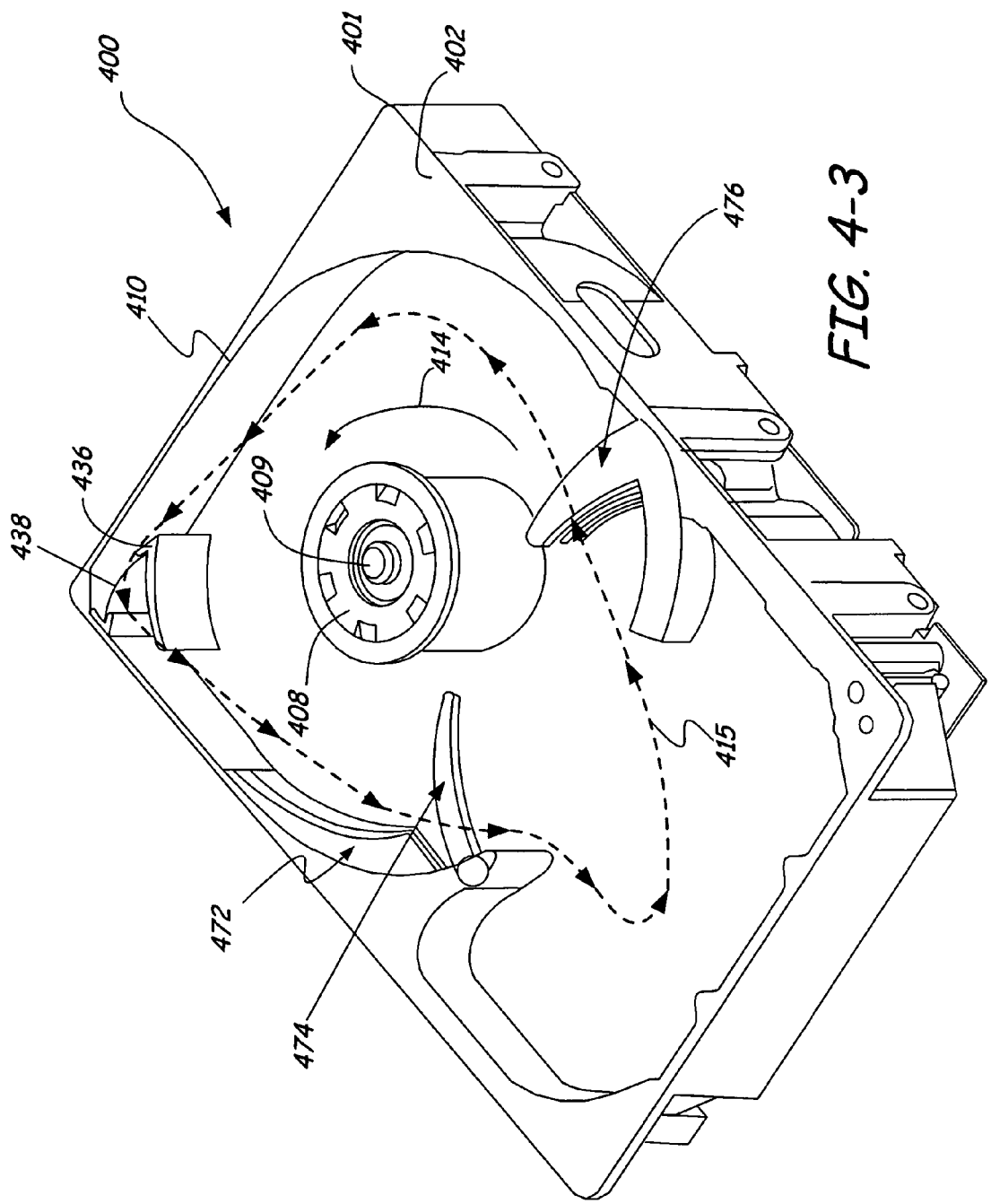

FIG. 3 schematically illustrates a flow path 242 of a particle 244 near spinning disc 207. The airflow containing particle 244 has both a radial component of airflow 216 and circumferential component of airflow 215. Particle 244 travels outwardly along a generally spiral path 242 to a bare shroud wall 210 at 250. Particle 244 can persist in flow path 242 by bouncing off the bare shroud wall 210 and moving back on to spinning disc 207 at 252. Particle 244 can also persist in flow path 242 by remaining in the airflow 216 and 215 and moving back on to spinning disc 207 at 252. As illustrated, particle 244 can recirculate back onto the disc 207 many times, where it is available to damage either the disc 207 or a read/write head (not illustrated) lying over the disc 207. If the particle does not escape the shrouded disc area via the circumferential airflow 215, it will flow back toward the center of disc 207, increasing the chance of creating a defect in the head disc interface (HDI).

FIG. 4-1 is a plan view of base deck 402 in enclosure 401 of disc drive 400. Base desk 402 is configured for incorporation into a data storage system. For example, base deck 402 can be substituted for base deck 102 within disc drive 100 (see FIG. 1). FIG. 4-1 illustrates particle deposition locations found on the surface floor 403, on the shroud walls 410, and/or other portions of base deck 402 after disc drive 400 has been experimentally injected with particles.

When disc drive 400 is operational, the discs (not shown in FIG. 4-1) are configured to rotate about central axis 409 and are secured to the base deck 402 by disc clamp 408. The rotation of the discs in the rotational direction 414 induces a radial component of airflow 416 and a circumferential component of airflow 415. Base deck 402 includes filter support 436 configured to support recirculation filter 438. Base deck 402 also includes actuator assembly 422. The actuator assembly 422 has a slider 412 supported by a suspension 418 which is in turn attached to a track accessing arm 420. Actuator assembly 422 is rotated about a shaft 426 by a voice coil motor 424.

After experimentally injecting particles within disc drive 400, particles tended to deposit in certain areas on the surface floor 403, shroud walls 410, etc. of base deck 402 of disc drive 400. In experiments for one particular design, these particle deposition locations are highlighted in disc drive 400 by the crosshatched areas of base deck 402. For example, the circumferential airflow 415 is partially blocked by actuator assembly 422 and voice coil motor 424. When actuator assembly 422 and voice coil motor 424 block airflow 415, harmful particles found in airflow 415 may be deflected in the process and deposited on the surface floor 403 of base deck 402 in regions 440 and 442. Typically, particles are deposited in large recirculation regions and stagnation points of the airflow 415. Recirculation regions are located in the wake of objects that are blocking the airflow 415. In another example, when airflow 415 leaves the actuator assembly 422 and passes by shroud wall 410, airflow 415 is partially blocked by shroud wall 410. When shroud wall 410 blocks airflow 415, harmful particles found in airflow 415 lose their inertia and deposit on the shroud wall 410 or on the surface floor 403 of base deck 402 in region 444. Still in another example, when airflow 415 is directed towards recirculation filter 438 by shroud wall 410, airflow 415 is partially blocked by filter support 436 and recirculation filter 438. When filter support 436 and recirculation filter 438 block airflow 415, the harmful particles found in airflow 415 lose their inertia and deposit on the shroud wall 410 or surface floor 403 of base deck 402 in region 446.

The particles that deposit in particle deposition locations as discussed above are not permanent depositions. Particles can become airborne and re-enter the circumferential airflow 415. To increase permanent particle deposition and decrease the presence of particles in the HDI, particle deposition surfaces are placed within disc drive 400 in accordance with embodiments of the invention. Particle deposition surfaces have a surface roughness height of at least 30 microns. Preferably, particle deposition surfaces have a surface roughness height of at least 50 microns. While large particles, such as 5 micron particles, easily dispose onto the walls in a prior art disc drive (see FIG. 2) due to inertial forces, sub-micron particles, such as particles that are 0.1 micron and smaller, have negligible inertia. These sub-micron particles are too small to easily deposit on walls of the disc drive because of turbulent eddy-impacting behavior, and are too big to diffuse due to Brownian motion. The surface roughness height of at least 30 microns on the particle deposition surfaces can improve the permanent deposition of particles whether they are large or sub-micron sized particles.

FIG. 4-2 illustrates a plan view of base deck 402 in enclosure 401 showing particle deposition surfaces in accordance with an embodiment of the present invention. In one aspect of the invention, particle deposition surfaces 450 and 452 are placed on the surface floor 403 of base deck 402 adjacent to actuator assembly 422 and voice coil motor 424, with a surface roughness height of at least 30 microns. Particle deposition surfaces 450 and 452 trap particles in airflow 415 that are deposited in these regions when airflow 415 is blocked by actuator assembly 422 and voice coil motor 424. In addition, particle deposition surface 458 is located on a side wall 466 of base deck 402 adjacent to voice coil motor 424 and actuator assembly 422. Particle deposition surface 458 has a surface of roughness height of at least 30 microns. Surface 458 traps particles in airflow 415 after airflow 415 is deflected by voice coil motor 424 and actuator assembly 422 and impinges side wall 466.

In another aspect of the invention, FIG. 4-2 illustrates particle deposition surface 454. Surface 454 is placed on the surface floor 403 of base deck 402 with a surface roughness height of at least 30 microns. Surface 454 traps particles in airflow 415 that are deposited in this region when airflow 415 is blocked by shroud wall 410. In addition, particle deposition surface 460 has a surface roughness height of at least 30 microns and is located on a portion of shroud wall 410 facing radial airflow 416. Particle deposition surface 460 traps particles in airflows 415 and 416 that impinge shroud wall 410 at this location Particle deposition surface 460 is for illustration purposes only. However, particle deposition surface 460 could extend along the entire shroud wall 410.

In still another aspect of the invention, FIG. 4-2 illustrates particle deposition surface 456. Surface 456 is placed on the surface floor 403 of base deck 402 with a surface roughness height of at least 30 microns. Surface 456 traps particles in airflow 415 that are deposited in this region when airflow 415 is blocked by recirculation filter 438 and filter support 436. In addition, particle deposition surface 462 is located on side wall 468 and side wall 470 of base deck 402 adjacent to filter support 436 and recirculation filter 438. Surface 462 has a surface of roughness height of at least 30 microns. Surface 462 traps particles in airflow 415 after airflow 415 is deflected by filter support 436 and recirculation filter 438 and impinges side walls 468 and 470. Also, particle deposition surface 464 surrounds filter support 436. Surface 464 has a surface roughness height of at least 30 microns and traps particles in airflow 415 which impinge on filter support 436.

All and/or some of all the above-described particle deposition surfaces can be included in disc drive 400. FIG. 4-2 illustrates portions of the surface floor 403 of base deck 402, portions of side walls 466, 468 and 470 of base deck 402 and a portion of shroud wall 410 having particle deposition surfaces. However, the present invention is not limited to only these surfaces. Instead, these surfaces are illustrative of surfaces shown to have high concentrations of impacting particle in one particular example.

FIG. 5 schematically illustrates a cross-sectional view of disc drive 500 in an embodiment of the present invention. FIG. 5 shows that in another aspect of the present invention the particle deposition surfaces 540 can be located such that they cover all or most of the top surface 505 of top cover 504 and/or the surface floor 503 of base deck 502. In still another aspect of the invention, the particle deposition surface 540 can be located such that it covers all or most of all the shroud wall 510. Those skilled in the art should recognize that other shroud walls can exist in disc drive 500 that do not completely surround discs 507. Particle deposition surface 540 can be located on these shroud walls. In yet another aspect of the invention, particle deposition surface 540 can be located on the surface of disc separator plate 578. Disc separator plate 578 is a flow control component which mitigates disturbances in airflow and attenuates vibration. Disc separator plate 578 is located between discs 507. Disc separator plate 578 can also be located above and below discs 507. Again, all and/or some of all these particle deposition surfaces can be included in disc drive 400 of FIG. 4-2.

Other surfaces of components within disc drive 400 of FIG. 4-2 and FIG. 4-3 can have particle deposition surfaces having a surface roughness height of at least 30 microns. In FIG. 4-2, these components are not limited by, but include: the surface of the voice coil motor 424, the surface of track accessing arm 420, the surface of suspension 418, and any other surface located on the actuator assembly 422. FIG. 4-3 illustrates a perspective view of disc drive 400 having a plurality of flow control components. These flow control components are configured to mitigate disturbances in airflow 415 (shown in FIG. 5) and attenuate vibration within disc drive 400 and 500. Each of the plurality of flow control components can have a surface roughness of at least 30 microns. These components are not limited by, but can include: upstream air dam 472, upstream air vane 474, downstream air dam 476 and disc separator plate 578

(shown in FIG. 5). Other examples of components that can have particle deposition surfaces, but are not shown, are coplanar fins and air vane latches. All and/or any of the above-described components along with any other flow control components with particle deposition surfaces can be included in disc drives 400 and 500.

FIGS. 6 and 7 are expanded views of surface roughness 600, 700 on particle deposition surfaces 640, 740, which are example embodiments of particle deposition surface 540. The surface roughness 600, 700 on the particle deposition surfaces 640, 740 can be of a variety of geometry. FIG. 6 is an example of surface roughness 640 having a plateau peak and valley shape. The ratio of height 606 to spacing 604 is the packing density of surface roughness 640. Packing density can be a function of the operating conditions and drive architecture. Stated another way, packing density can be a function of spindle speed, disc size and clearances such as the top cover, base deck and shroud wall. Optimally, the packing density should be an order of magnitude of one. The height 606 is at least 30 microns. Preferably, the height 606 is at least 50 microns. FIG. 7 is an example of surface roughness 700 having a triangular peak and valley shape. Again, the ratio of height 706 to spacing 704 is the packing density of surface roughness 740. The height 706 is at least 30 microns. Preferably, the height 706 is at least 50 microns. As stated previously, other surface roughness geometries may be utilized. While surface roughness patterns exist having uniform surface roughness heights of at least 30 microns as shown in FIGS. 6 and 7, random surface roughness patterns can be used as well. In other words, the heights of the various surface roughness features can vary so long as a substantial percentage of the surface roughness features have a height of at least 30 microns. For example, if at least fifty percent of the surface roughness features have heights of at least 30 microns, the surface roughness can be considered to be at least 30 microns.

The particle deposition surface 640, 740 can be disposed in, for example, disc drive 100 of FIG. 1, disc drive 400 of FIG. 4-2, disc drive 400 of FIG. 4-3 and disc drive 500 of FIG. 5 by a variety of manufacturing methods. In one aspect of manufacturing, the particle deposition surface 540, 640, 740 can be randomly cast during manufacture of disc drive 100, 400, 500. A drawback to casting a particle deposition surface 540, 640, 740 in disc drive 100, 400, 500 is that there is a surface roughness 600, 700 height limit. This surface roughness 600, 700 height limit is a function of the draft angle. The draft angle is the angle between the direction the cavity is being cast and the direction that the cavity is pulled apart after casting. As the draft angle increases, the cast reaches a limit of surface roughness 600, 700 height.

In another aspect of manufacturing, the particle deposition surface 540, 640, 740 can be cast as a single dimension roughness in the z-direction in disc drive 100, 400, 500. The z-direction of disc drive 100, 400, 500 is the direction parallel to the central axis 109, 409 of the discs 107, 507. Roughness 600, 700 can be a bundle of uniform vertical grooves along the z-direction and applied to any existing cast component such as shroud wall 410, 510.

In yet another aspect of manufacturing, particle deposition surfaces 540, 640, 740 of disc drive 100, 400, 500 having surface roughness 600, 700 can be a specialty coating containing a roughness height of at least 30 microns placed on an existing disc drive surface. This coating is applied after disc drive 100, 400, 500 is manufactured. For example, the specialty coating can be an epoxy coating designed to include the desired surface roughness.

In yet another aspect of manufacturing, the particle deposition surfaces 540, 640, 740 of disc drive 100, 400, 500 can be an application of a micro-embossed film or other stick-on application. The stick-on film has a pre-manufactured roughness height of at least 30 microns on one side and an adhesive on the opposite side. The adhesive side adheres to an existing surface, for example shroud wall 410, 510 or other surfaces as discussed above after the manufacture of disc drive 100, 400, 500. The surface roughness height is at least 30 microns.

FIG. 8 shows plot 800 comparing 0.1 micron particle count ratios on shroud walls in a variety of data storage systems. The vertical axis 802 shows particle count ratios. The particle count ratio is a 0.1 micron particle count value on a shroud wall without disc stack spin to a 0.1 micron particle count value on a shroud wall with disc stack spin. Both simulations, disc spin and no disc spin, do not include the presence of a recirculation filter within the enclosure of the disc drive. The larger the ratio of these two particle count values the more 0.1 micron particle deposition occurs on the shroud wall and less harmful 0.1 micron particles are found in the air within the disc drive.

The first bar 804 represents the particle count ratio in a prior art disc drive. The prior art disc drive can be a data storage system like disc drive 200 of FIG. 2. The particle count ratio on the shroud wall of the prior art disc drive was 5.4. The second bar 806 represents the particle count ratio in a disc drive containing a plastic shim on the shroud wall. A shroud wall with a particle deposition surface will affect the airflow patterns within the disc drive due to the changed dimension of the shroud wall. The plastic shim simulates the dimensions of a shroud wall with a particle deposition surface, but the plastic shim does not have a surface roughness. The particle count ratio on the plastic shim shroud wall was 5.51. The third bar 808 represents the particle count ratio of a shroud wall with a particle deposition surface. A rough shim containing a 140 micron surface roughness was placed on the shroud wall. The particle count ratio on the rough shim shroud wall was 7.26. The rough shim shroud wall yielded approximately 24% improvement in particle deposition over the prior art shroud wall and the plastic shim shroud wall.

FIG. 8 demonstrates the increase in particle count ratios when a surface having a higher surface roughness is introduced into a data storage system. Although a surface roughness of 140 microns was used in one experiment, it has been found that surface roughness of at least about 30 microns provide the advantageous particle entrapment function of the invention. In more specific embodiments, surface roughness of at least about 50 microns performed well. The particles deposition surfaces having a minimum surface roughness are in contrast to a filter through which air may flow.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data storage system for enhanced particle deposition, it will be appreciated by those skilled in the art that the teachings of the present invention can be applied to other embodiments, without departing from the scope and spirit of the present invention.

What is claimed is:

1. A data storage system comprising:
    an enclosure;
    at least one disc which rotates about a central axis within the enclosure and having a corresponding air flow subject to contamination by particles; and
    a particle deposition surface inside the enclosure having a surface roughness of at least 30 microns, such that particles contaminating the airflow are deposited on the particle deposition surface.

2. The data storage system of claim 1, wherein the particle deposition surface has a surface roughness of at least 50 microns.

3. The data storage system of claim 1, wherein the airflow further comprises:
    a radial airflow that flows from the central axis to an outer disc edge of the at least one disc; and
    a circumferential airflow that flows in a rotational direction about the central axis of the disc.

4. The data storage system of claim 3, wherein the particle deposition surface is on a shroud wall that is spaced radially outward from the outer disc edge and facing the radial airflow.

5. The data storage system of claim 3, wherein the particle deposition surface is on a filter support configured to support a recirculation filter, wherein the recirculation filter is spaced radially outward from the outer edge of the disc and interposed in the circumferential airflow.

6. The data storage system of claim 1, wherein the enclosure further comprises a top cover and base deck having the particle deposition surface on surfaces of the top cover and the base deck.

7. The data storage system of claim 1, further comprising:
    an actuator configured to position a transducing head relative to the disc, the actuator having a suspension coupled to a track accessing arm to support the transducing head; and
    a voice coil motor configured to rotate the actuator and to move the transducing head in an arcuate path from a disc inner diameter to a disc outer edge.

8. The data storage system of claim 7, wherein the particle deposition surface is on a surface of the actuator.

9. The data storage system of claim 7, wherein the particle deposition surface is on a surface of the voice coil motor.

10. The data storage system of claim 7, wherein the particle deposition surface is on a surface of the track accessing arm.

11. The data storage system of 1, further comprising a plurality of flow control components configured to mitigate airflow disturbances and attenuate vibration in the data storage system.

12. The dab storage system of claim 11, wherein the particle deposition surface is on surfaces of the plurality of flow control components.

13. A method of removing particles from an airflow within a data storage system, the method comprising:
    providing an enclosure;
    providing a particle deposition surface within the enclosure, the particle deposition surface having a surface roughness of at least 30 microns;
    generating an airflow with at least one disc, the airflow being subject to contamination by particles; and
    depositing the particles contaminating the airflow on the particle deposition surface.

14. The method of claim 13, wherein providing the particle deposition surface further comprises providing the particle deposition surface having a surface roughness of at least 50 microns.

15. The method of claim 13, wherein providing the particle deposition surface further comprises providing the particle deposition surface on a shroud wall.

16. The method of claim 13, wherein providing the particle deposition surface further comprises providing the particle deposition surface on a surface of a top cover of the enclosure.

17. The method of claim 13, wherein providing the particle deposition surface further comprises providing the particle deposition surface on a surface floor of a base deck of the enclosure.

18. A data storage system comprising:
    an enclosure;
    a data storage medium within the enclosure; and
    particle deposition surface means inside the enclosure for trapping sub-micron sized particles from an airflow within the enclosure wherein the particle deposition surface means has a surface roughness of at least 30 microns.

19. The data storage system of claim 18, wherein the particle deposition surface means has a surface roughness of at least 50 microns.

* * * * *